UNITED STATES PATENT OFFICE 2,648,704

PROCESS OF TREATING PROTEIN HYDROLYSIS LIQUOR

Tetsuwo Ogawa and Mei Ohno, Kawasaki, Japan

No Drawing. Application August 22, 1950, Serial No. 180,914. In Japan August 22, 1949

1 Claim. (Cl. 260—529)

This invention relates to a process of treating protein hydrolysate to obtain glutamic acid for use as a seasoning agent.

In accordance with the invention, the protein hydrolysate obtained by the hydrolysis of crude protein material with mineral acids is extracted with a polar solvent, such as ethers, water-insoluble alcohols or esters, and the impurities, especially levulinic acid are separated out. By separating these impurities which retard the crystallizing out of glutamic acid crystals, a high grade of glutamic acid is efficiently produced and the motor liquor from which the crystals are removed may be utilized as the raw material for producing excellent amino acid soy.

Glutamic acid is usually produced from a seed material which is composed of an oily or a starchy substance. It is possible to separate easily a comparatively pure protein as intermediate product from the oily material, but as the starchy material is composed of various kinds of carbohydrates, it is difficult to separate pure protein. It has been known that the impure carbohydrate decomposition products retard considerably the crystallizing out of glutamic acid hydrochloride from hydrolysate by mineral acids, but heretofore no study has been made as to the substance retarding such crystallization.

We have discovered that in the crystallization of crude glutamic acid hydrochloride from protein hydrolysate, levulinic acid and oxy-methylfulfural act as retarding materials for the crystallizing out of glutamic acid crystals. We have further ascertained that in the hydrolysis of protein such as in the manufacture of glutamic acid, most of the carbohydrate in the impure raw material decomposes into volatile substances, levulinic acid and oxalic acid, etc. Levulinic acid does not only retard the crystallization of glutamic acid or its hydrochloride but also is not an effective component of seasoning agents such as amino-acid soy. The existence of levulinic acid, therefore, only increases the consumption of the soda components used as neutralizing agents.

The object of this invention is to produce an excellent quality glutamic acid with high yield, treating previously prepared hydrolysate with an organic volatile solvent which has more than 4 in dielectric constant value (at 25° C.) and is substantially non-miscible with water such as ethers, acetons, water-insoluble alcohols and esters to extract levulinic acid and oxalic acid together with the other useless decomposition components of protein and the portion in the reaction product between protein. A further object of this invention is to obtain an excellent odorless acid-soy, effecting the deodorization of the mother liquor crystallized of the crystals or hydrolysate itself by removing volatile by-products.

In an experiment, using defatted soya beans, 9.8% material was extracted from the solvent, 70–75% of the raw material contained levulinic acid, 6–7% oxalic acid and 12–13% volatile acid such as acetic acid and formic acid. (In this experiment, as the hydrolysate was originally condensed, the volatile acid was decreased, therefore the amount of extracted material should be further increased substantially and the comparison of component should also be changed therewith.)

Further, in the solvent extraction of hydrolysate, the specific gravity and the viscosity of the extracted hydrolysate itself decrease considerably, showing the following change:

|  | Nitrogen conc. 3.5% | | Nitrogen conc. 4.5% | |
| --- | --- | --- | --- | --- |
|  | Specific gravity | Viscosity | Specific gravity | Viscosity |
| Before extraction | 1.173 | 3.45 | 1.229 | 7.35 |
| After extraction | 1.145 | 2.40 | 1.195 | 4.70 |

Specific gravity and viscosity were calculated at 70° C. and 18° C. respectively.

By removing impurities such as levulinic acid as taught by the present invention, the rate of crystallization of glutamic acid and its hydrochloride is considerably increased and a smaller amount of neutralizing agent is used. This results in an improved quality product at a substantial saving in the cost of production. Furthermore, the separated levulinic acid may be utilized in other industrial fields.

The following examples are illustrative of the process:

*Example 1*

0.5 kg. defatted soya beans was hydrolyzed with 20% hydrochloric acid at a temperature of 110° C. Huminous substance was filtered off and the filtrate condensed to a nitrogen concentration of 4.0%. The hydrolysate was then extracted with 0.5 liter of ether and evaporated to a specific gravity of 30.5° Bé. and 0.6 liter hydrochloric acid was added and the solution allowed to stand for two weeks at 5° C. Glutamic acid hydrochloride crystallized out and glutamic acid was separated therefrom in the usual manner. 30 grams glutamic acid was obtained which compared with a yield of 24.5 grams obtained by the usual practice without extracting with ether, indicated an increased yield of 22.5%.

The glutamic acid mother liquor was neutralized to a pH 3.5, huminous substances were filtered and the pH regulated to 4.7. A substantially odorless soy was obtained as by-product.

*Example 2*

Concentrated hydrolysate containing about 4.5% of nitrogen was obtained by hydrolyzing 0.5 kg. of dry wheat gluten with amyl acetate, condensing it further to a nitrogen content of 5.5% and neutralizing immediately with caustic soda solution to pH 3.2. After cooling for two weeks and separating glutamic acid crystallized therefrom, there was obtained 118 g. pure glutamic acid. Comparing this value with 105 g. of the yield of pure glutamic acid in the common hydrochloride method, indicates a 12.3% increase in the yield.

*Example 3*

0.1 kg. defatted castor seed was hydroylzed with hydrochloric acid and neutralized with 3.0 caustic soda. Huminous substances were filtered off and the hydrolysate was extracted with 0.2 liter of ether. The liquor thus extracted was neutralized to pH 4.7. A sodium chloride solution was added and the nitrogen content regulated to 2.0 g./dl. There was obtained 0.21 liter amino acid soy. This product was found to be much superior in taste and smell to products obtained without extracting the hydrolysate and permitted a saving of 9.5% in soda consumption.

We claim:

Process of treating protein hydrolysate, comprising hydrolyzing vegetable protein by heating with hydrochloric acid to form a solution, neutralizing the solution to pH 3.0 to 3.5 by addition of alkali, filtering off huminous substance and concentrating the filtrate, adding a water-insoluble organic solvent selected from the group consisting of amyl acetate and ether and capable of readily dissolving levulinic acid to separate the solution into two layers, and recovering levulinic acid from the upper layer of said solution while obtaining glutamic acid from the lower layer.

TETSUWO OGAWA.
MEI OHNO.

References Cited in the file of this patent

UNITED STATES PATENTS

| Number | Name | Date |
|---|---|---|
| 1,035,591 | Ikeda et al. | Aug. 13, 1912 |
| 1,602,958 | Woo | Oct. 12, 1926 |
| 2,176,785 | Braun | Oct. 17, 1939 |
| 2,460,040 | Sifferd | Jan. 25, 1949 |

OTHER REFERENCES

Anson et al.: "Advances in Protein Chemistry" (Academic Press), vol. II, page 122 (1945).